(12) United States Patent
Wang et al.

(10) Patent No.: US 9,108,631 B2
(45) Date of Patent: Aug. 18, 2015

(54) HYBRID VEHICLE AND ASSOCIATED CONTROL METHOD

(71) Applicant: FORD GLOBAL TECHNOLOGIES, LLC, Dearborn, MI (US)

(72) Inventors: Qing Wang, Canton, MI (US); Ming Lang Kuang, Canton, MI (US); Fazal Urrahman Syed, Canton, MI (US); Ryan Abraham McGee, Ann Arbor, MI (US); Jason Meyer, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/768,068

(22) Filed: Feb. 15, 2013

(65) Prior Publication Data

US 2014/0005867 A1    Jan. 2, 2014

Related U.S. Application Data

(63) Continuation-in-part of application No. 13/539,945, filed on Jul. 2, 2012, now Pat. No. 8,834,317.

(51) Int. Cl.
| | |
|---|---|
| B60K 1/02 | (2006.01) |
| B60W 20/00 | (2006.01) |
| B60K 6/445 | (2007.10) |
| B60W 10/105 | (2012.01) |
| F16H 61/66 | (2006.01) |
| F16H 59/20 | (2006.01) |
| F16H 59/02 | (2006.01) |

(52) U.S. Cl.
CPC ............... *B60W 20/10* (2013.01); *B60K 6/445* (2013.01); *B60W 10/105* (2013.01); *B60W 20/30* (2013.01); *F16H 61/66* (2013.01); *B60W 2540/16* (2013.01); *F16H 59/20* (2013.01); *F16H 2059/0239* (2013.01); *F16H 2061/6616* (2013.01); *Y02T 10/6239* (2013.01); *Y10T 477/23* (2015.01)

(58) Field of Classification Search
CPC .............................. B60W 20/10; B60W 20/30
USPC .......... 477/3, 101, 107, 115, 108, 15; 701/22; 180/65.265, 65.27, 65.28
See application file for complete search history.

(56) References Cited

U.S. PATENT DOCUMENTS

| | | | | |
|---|---|---|---|---|
| 6,909,959 | B2 * | 6/2005 | Hallowell .................... | 701/88 |
| 7,676,313 | B2 * | 3/2010 | Ortmann et al. ............. | 701/64 |
| 7,869,926 | B2 * | 1/2011 | Tuckfield et al. ............ | 701/56 |
| 7,921,943 | B2 * | 4/2011 | Ueoka et al. ............. | 180/65.21 |
| 8,088,035 | B2 * | 1/2012 | Yamamoto .................... | 477/3 |
| 8,313,414 | B2 * | 11/2012 | Kuwahara et al. ........... | 477/101 |
| 2006/0231306 | A1 | 10/2006 | Severinsky et al. | |
| 2011/0202222 | A1 | 8/2011 | Yamamoto | |

\* cited by examiner

*Primary Examiner* — David J Hlavka

(74) *Attorney, Agent, or Firm* — David B. Kelley; Brooks Kushman P.C.

(57) ABSTRACT

A hybrid vehicle and method of control include an internal combustion engine and at least one traction motor operated in an automatic mode such that the combined wheel torque is a function of accelerator pedal position and vehicle speed. In a select shift mode, wheel torque is also a function of a virtual gear number. The virtual gear number varies in response to driver activation of shift selectors or automatically in response to changes in vehicle speed. The vehicle transitions into select shift mode in response to driver activation of a downshift selector. When the transition occurs, an initial virtual gear number is selected to ensure that wheel torque increases.

11 Claims, 11 Drawing Sheets

HYBRID VEHICLE AND ASSOCIATED CONTROL METHOD

CROSS-REFERENCE TO RELATED APPLICATIONS

This application is a continuation-in-part of U.S. application Ser. No. 13/539,945 filed Jul. 2, 2012, now U.S. Pat. No. 8,834,317, the disclosure of which is incorporated in its entirety by reference herein.

TECHNICAL FIELD

This disclosure relates generally to controlling the engine speed and combined output torque of a hybrid vehicle in response to driver inputs.

BACKGROUND

In a vehicle having a discrete ratio transmission, the speed of the transmission input shaft is constrained to be proportional to the vehicle speed with a finite set of ratios, except during the brief interval while the transmission is shifting from one ratio to another ratio. When the torque converter is locked, the engine speed is also constrained to be proportional to vehicle speed. In a hybrid electric vehicle having a power-split architecture, on the other hand, the transmission does not mechanically impose a strict relationship between the engine speed and the vehicle speed.

Even in vehicles with automatic transmissions, in which selection of the gear ratio or engine speed is ordinarily determined by a controller, some drivers prefer to occasionally over-ride the controller to provide operation similar to a manual transmission. Some vehicles are equipped with shift paddles or other driver interface features which permit the driver to signal a desire for a higher or a lower gear ratio relative to the gear ratio automatically selected by the vehicle controller, with an associated change in engine speed and vehicle torque. In a discrete ratio transmission, the controller responds to such a command by shifting to a different one of the discrete gear ratios, which adjusts engine speed accordingly and provides associated torque multiplication at the vehicle wheels. However, in a vehicle with a continuously variable transmission or similar gearbox, such as a power-split hybrid, the response is more complicated because the transmission does not inherently provide discrete gear ratios with associated different torque multiplication.

SUMMARY

In various embodiments, a hybrid vehicle control strategy implements four different operating modes. The vehicle controller determines which operating mode is utilized at any given time in response to operation of various driver interface elements including a shift lever, a downshift selector, and an upshift selector, for example. In two of the operating modes, the controller permits the driver to select a virtual gear that impacts the engine speed and the combined output torque of the engine and one or more traction motors. The controller can utilize different logic for shutting the engine off and driving solely with electric power depending on which operating mode is active.

In one embodiment, a method of controlling a hybrid vehicle includes controlling an engine and a traction motor in an automatic mode and then increasing the wheel torque to transition to a select shift mode. In the automatic mode, the wheel torque is based on pedal position and vehicle speed. In the select shift mode, the wheel torque is based on a driver modifiable virtual gear number in addition to pedal position and vehicle speed. In the select shift mode, the wheel torque decreases as the virtual gear number increases. The method may include increasing the virtual gear number in response to operation of an upshift selector and decreasing the virtual gear number in response to operation of a downshift selector. The transition to select shift mode may be initiated by operation of the downshift selector. When transitioning to the select shift mode, the method may include selecting the highest initial virtual gear number that will result in a torque increase.

In another embodiment, a controller for a hybrid vehicle includes input communication channels, output communication channels, and control logic. The input communication channels receive input signals indicating vehicle speed, position of a driver operated accelerator pedal, driver operation of a downshift selector, and driver operation of an upshift selector. The output communication channels send control signals to an engine and at least one traction motor. The control logic is configured to control the engine and traction motor(s) in an automatic mode and then increasing the wheel torque to transition to a select shift mode. In the automatic mode, the wheel torque is based on pedal position and vehicle speed. In the select shift mode, the wheel torque is based on a driver modifiable virtual gear number in addition to pedal position and vehicle speed. In the select shift mode, the wheel torque decreases as the virtual gear number increases. The controller may increase the virtual gear number in response to operation of an upshift selector and decrease the virtual gear number in response to operation of a downshift selector. When transitioning to the select shift mode, the controller may select the highest initial virtual gear number that will result in a torque increase.

In another embodiment, a hybrid vehicle includes a planetary gear set and a controller. The elements of the planetary gear set, which include a sun gear, a ring gear, and a planet carrier, are drivably connected to an engine, a set of driving wheels, and a first electric machine. A second electric machine is drivably connected to the wheels. The controller is configured to control the engine and the electric machines in an automatic mode and then increasing the wheel torque to transition to a select shift mode. In the automatic mode, the wheel torque is based on pedal position and vehicle speed. In the select shift mode, the wheel torque is based on a driver modifiable virtual gear number in addition to pedal position and vehicle speed. When transitioning to the select shift mode, the controller may select the highest initial virtual gear number that will result in a torque increase.

Various embodiments according to the present disclosure can provide one or more advantages. For example, systems and methods for controlling a hybrid vehicle according to the present disclosure mimic or emulate a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
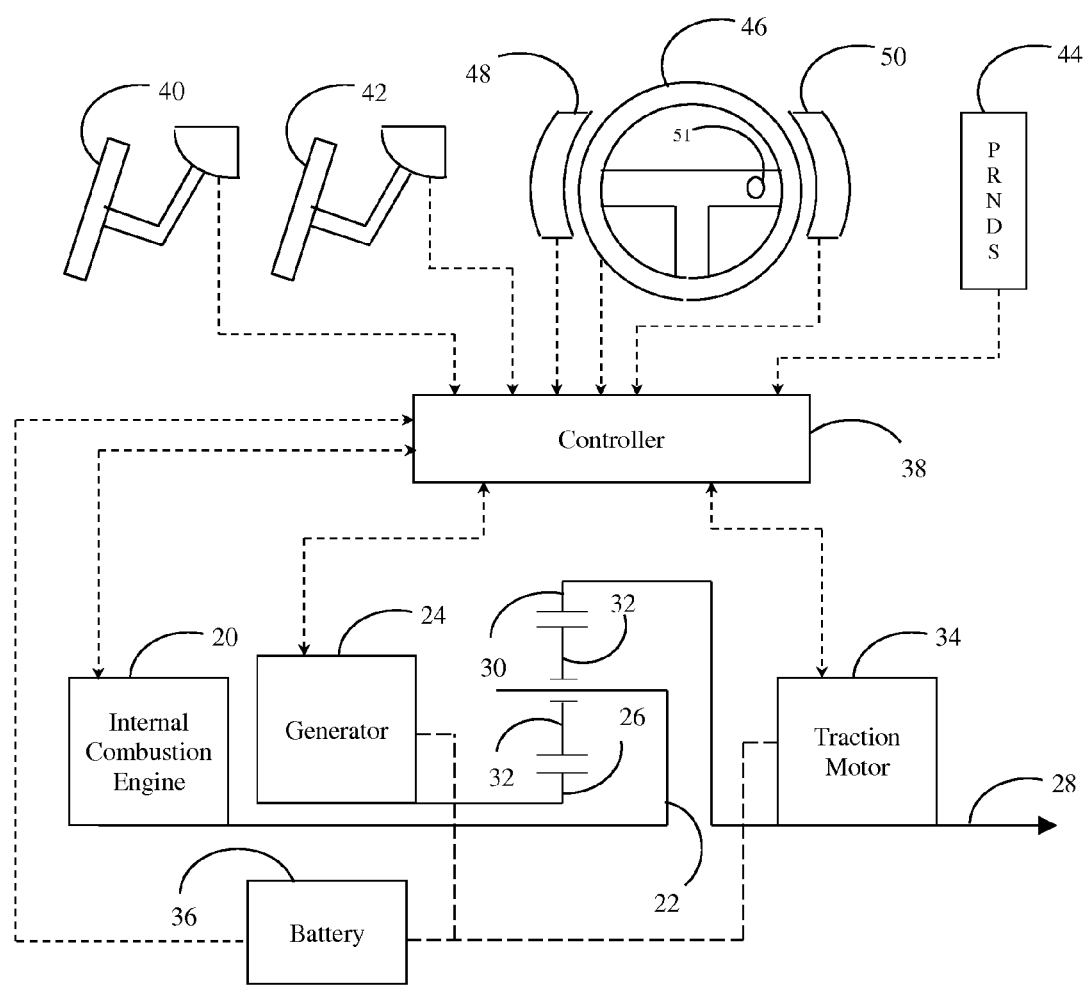
FIG. 1 is a schematic diagram illustrating a vehicle powertrain, controller, and user interface features of a representative embodiment of a hybrid vehicle according to the present disclosure.

A powertrain for a hybrid electric vehicle is illustrated schematically in FIG. 1. The powertrain includes an internal combustion engine 20 driveably connected to a planet carrier 22, a generator 24 driveably connected to a sun gear 26, and an output shaft 28 driveably connected to a ring gear 30. Elements are driveably connected when there is a mechanical power flow path between them such that the speeds of the elements are constrained to be substantially proportional. Planet carrier 22 supports a set of planet gears 32 such that each planet gear is in continuous meshing engagement with sun gear 26 and ring gear 30. Output shaft 28 drives the vehicle wheels directly or indirectly, such as via a differential assembly, for example.

Traction motor 34 is driveably connected to the output shaft 28. Both the generator 24 and the traction motor 34 are reversible electrical machines that are capable of converting electrical power into rotational mechanical power or converting rotational mechanical power into electrical power. The terms generator and motor should be regarded merely as labels for ease of description and does not limit the function or operation of either electrical machine. Generator 24 and traction motor 34 are both electrically connected to battery 36.

The rotational speed of sun gear 26, carrier 22, and ring gear 30 are linearly related such that the speed of carrier 22 is a weighted average of the speed of sun gear 26 and ring gear 30. Consequently, the speed of the engine 20 is not constrained to be proportional to the speed of the output shaft 28 in this arrangement. Instead, the engine speed can be selected or controlled independently of the vehicle speed by setting the generator speed accordingly. Power flows from the engine to the output shaft through a combination of mechanical power transfer and electrical power transfer. During some operating conditions, the engine 20 can generate more power than what is delivered to the output shaft 28 with the difference, neglecting efficiency losses, delivered to battery 36. Under other operating conditions, the battery 36 in combination with generator 24 and/or traction motor 34 can supplement the power delivered by the engine 20 such that more power is delivered to the output shaft 28.

The engine 20, generator 24, and traction motor 34, all respond to control signals from controller 38. These control signals determine the amount of torque generated. The controller also receives speed signals from the engine 20, generator 24, and traction motor 34 and a state of charge signal from battery 36. The controller accepts input signals indicating driver intention from a brake pedal 40, an accelerator pedal 42, a shift lever 44, a steering wheel 46, a downshift selector 48, an upshift selector 50, and a cruise control button 51. Shift lever 44 allows the driver to select Park, Reverse, Neutral, Drive, and Sport driving modes. The upshift and downshift selectors may, for example, be paddles mounted on opposite sides of the steering wheel. Other upshift and downshift selector implementations, such as additional positions of the shift lever, are known and are suitable for use with the present invention.

In certain operating modes, the engine speed may vary continuously in response to changes in accelerator pedal position as opposed to varying through discrete shift events. This terminology should not be construed to preclude use of a digital controller which manipulates a large but finite number of control signal levels at frequent time intervals.

Figure 2:
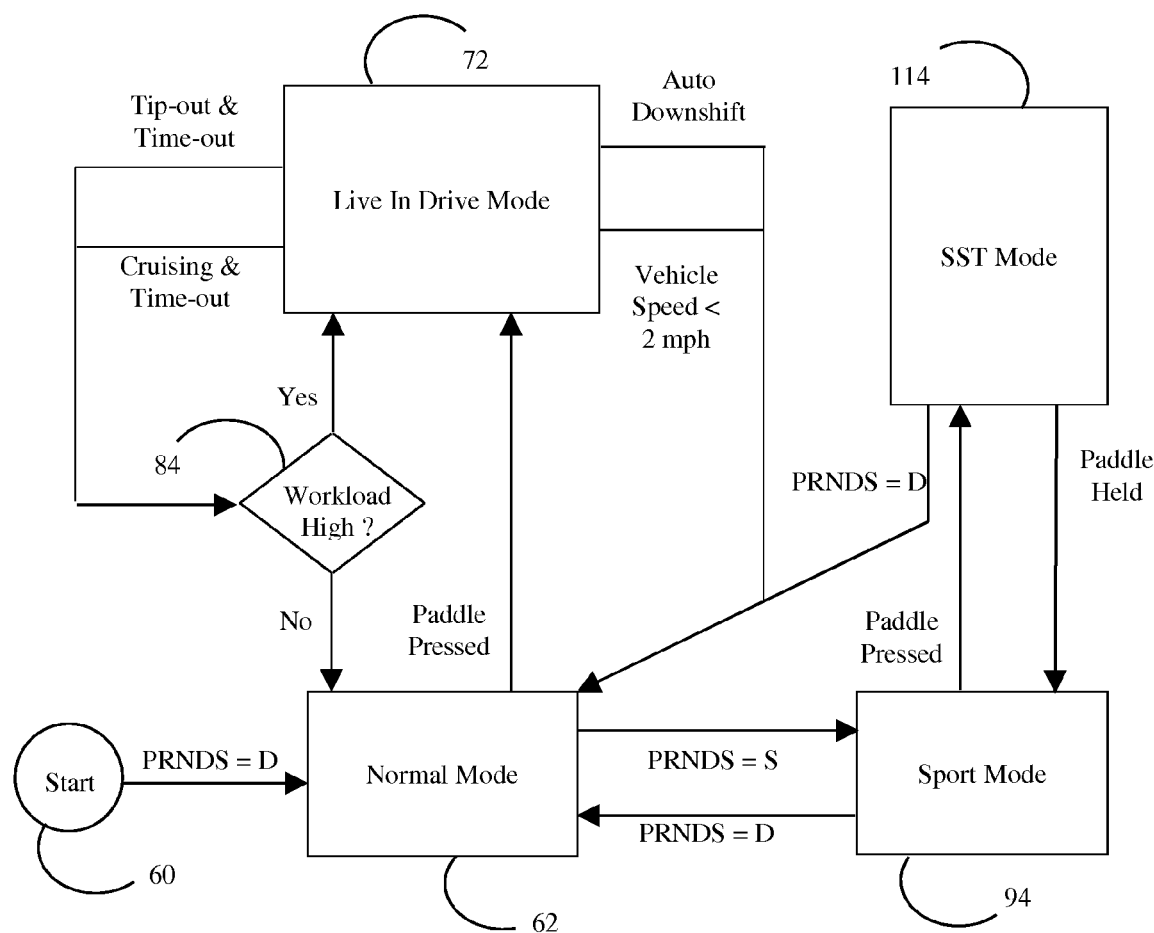
FIG. 2 is a state transition chart illustrating operation of a system or method of an embodiment of the present disclosure.
Figure 3:
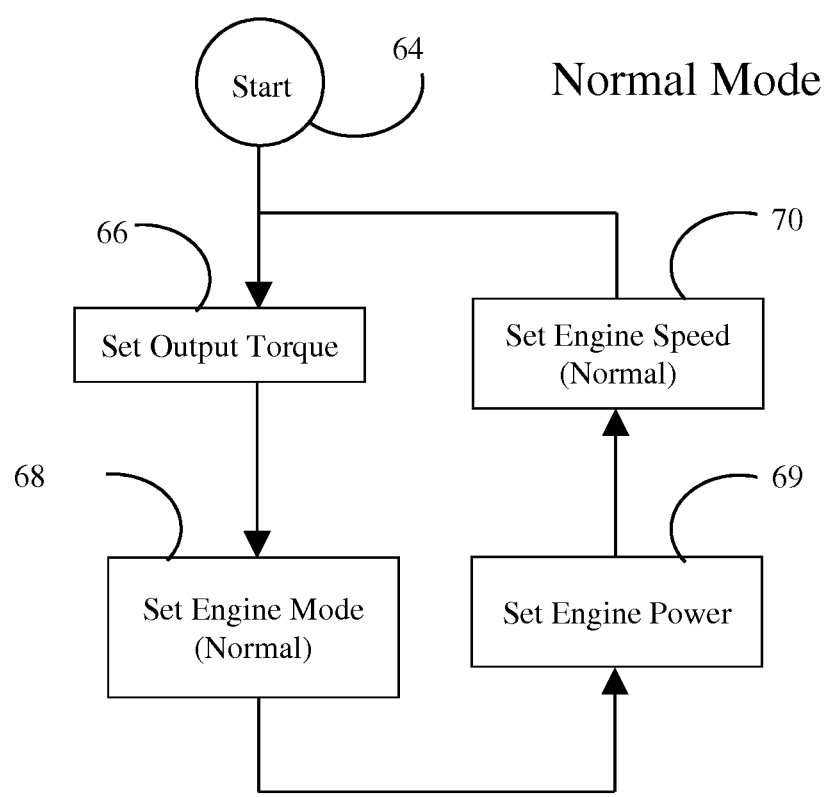
FIG. 3 is a flow chart illustrating operation of a system or method according to various embodiments when in a Normal operating mode.
Figure 4:
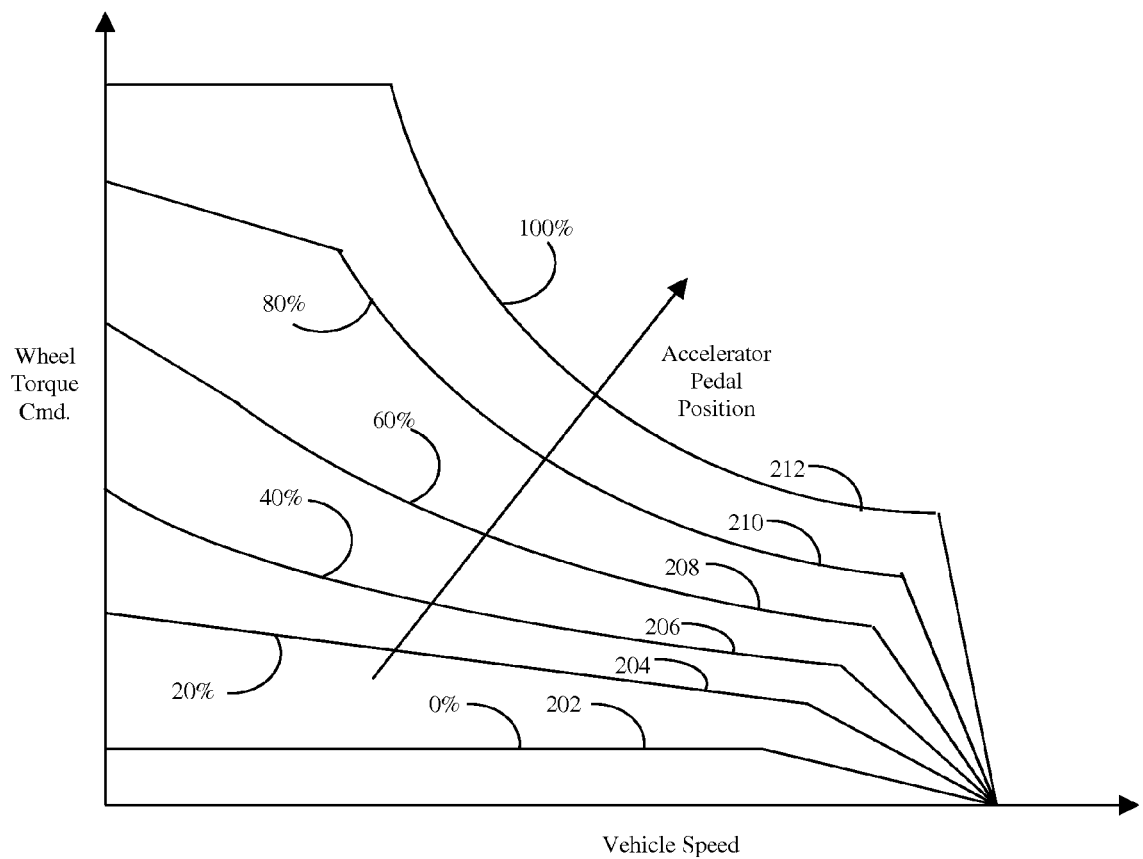
FIG. 4 is a graph illustrating a relationship between vehicle speed, accelerator pedal position, and wheel torque command of a representative embodiment according to the disclosure.
Figure 5:
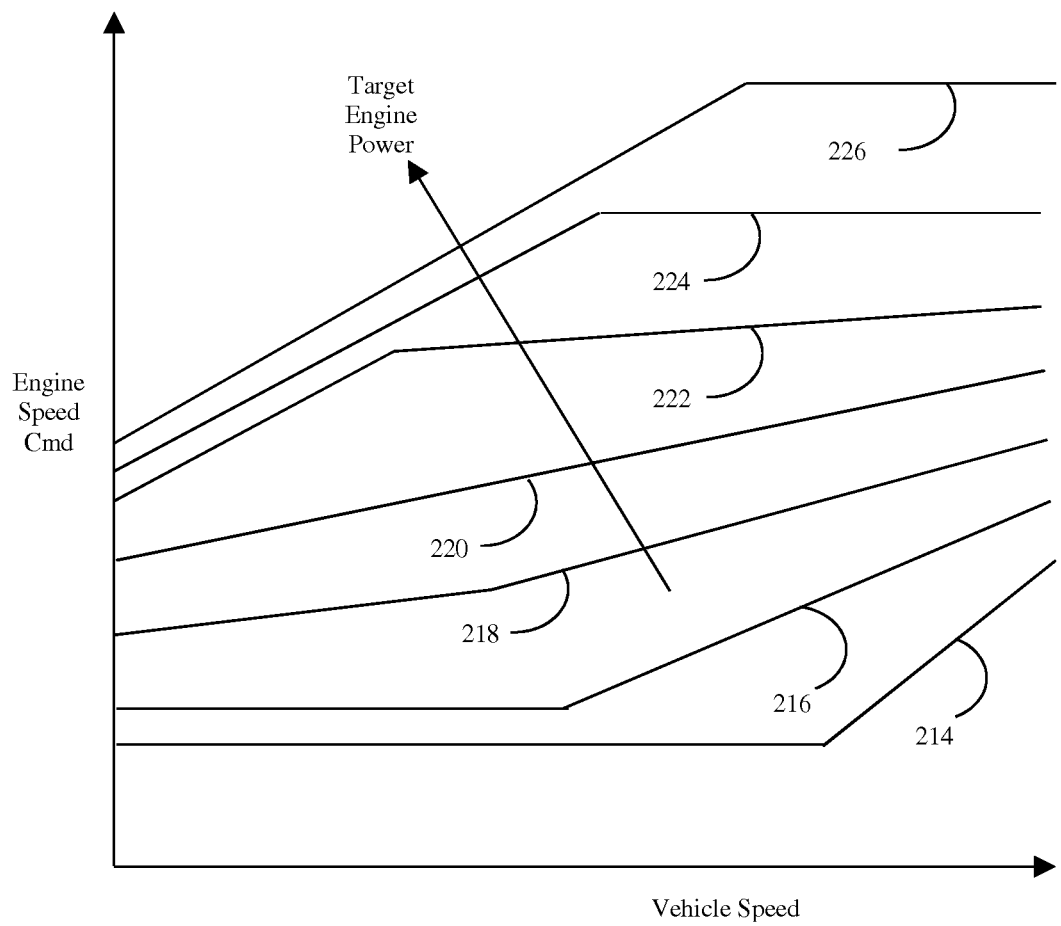
FIG. 5 is a graph illustrating a relationship between vehicle speed, target engine power, and engine speed command of a representative embodiment according to the disclosure.

The top level control states are illustrated in FIG. 2. The controller starts in state 60 and transitions to Normal mode 62 as soon as the driver selects the Drive (D) position using shift lever 44. Operation in Normal mode is illustrated by the flow diagram of FIG. 3. In Normal mode, the controller repeatedly performs the operations of setting the output torque 66, setting the engine mode 68, setting the engine power 69, and setting the engine speed 70. In Normal mode, the target output torque is calculated at step 66 based on accelerator pedal position and vehicle speed using a table such as that illustrated in FIG. 4. Vehicle speed can be calculated from traction motor speed or wheel speed sensors. Engine mode is set to either running or stopped at step 68 using a variety of input signals including battery state of charge, output power command, accelerator pedal position, and vehicle speed. If the engine mode is running, a target engine power and target engine speed is calculated at steps 69 and 70 to minimize fuel consumption while delivering the desired output torque and maintaining the battery at a desired state of charge. If the battery state of charge is near a target level, then the target engine power is set equal to the power that is to be delivered to the wheels which can be computed from the target wheel torque and the vehicle speed. If the battery state of charge is low, the target engine power is set higher to generate additional power to charge the battery. If the battery state of charge is high, the target engine power is set lower to conserve fuel. The target engine speed is computed based on target engine power and vehicle speed using a table such as that illustrated in FIG. 5. Finally, operating parameters of the engine, generator, and traction motor are adjusted such that the actual output torque and engine speed tend toward the selected targets.

Referring again to FIG. 2, the controller transitions from Normal mode 62 to Live-In-Drive (LID) mode 72 whenever the driver activates the downshift selector 48. LID mode permits the driver to influence the engine speed and wheel torque by selecting a virtual gear number. Operation in LID mode is illustrated by the flow diagram of FIG. 6. Upon entering LID mode, the controller selects an initial virtual gear ratio at step 74 and then repeatedly performs the operations of setting the output torque at steps 76 and 66', setting the engine power and engine speed at steps 69' and 78, and updating the virtual gear ratio in steps 80 and 82. Each of these operations is discussed in additional detail below. As shown in FIG. 2, a number of conditions cause the controller to transition back to Normal mode 62, including vehicle speed dropping below a low threshold value or an automatically selected downshift. Additionally, a transition can be triggered when the controller detects a cruising condition, as indicated by activation of the cruise control 51, or a tip-out condition, indicated by a reduction in accelerator pedal position, and the condition persists for some predetermined amount of time. This latter type of condition will not result in a transition, however, if the controller detects a high driver workload at step 84, such as might be indicated by large displacements of steering wheel 46, large yaw, pitch, or roll rates, or high longitudinal or lateral accelerations, for example.

Figure 7:
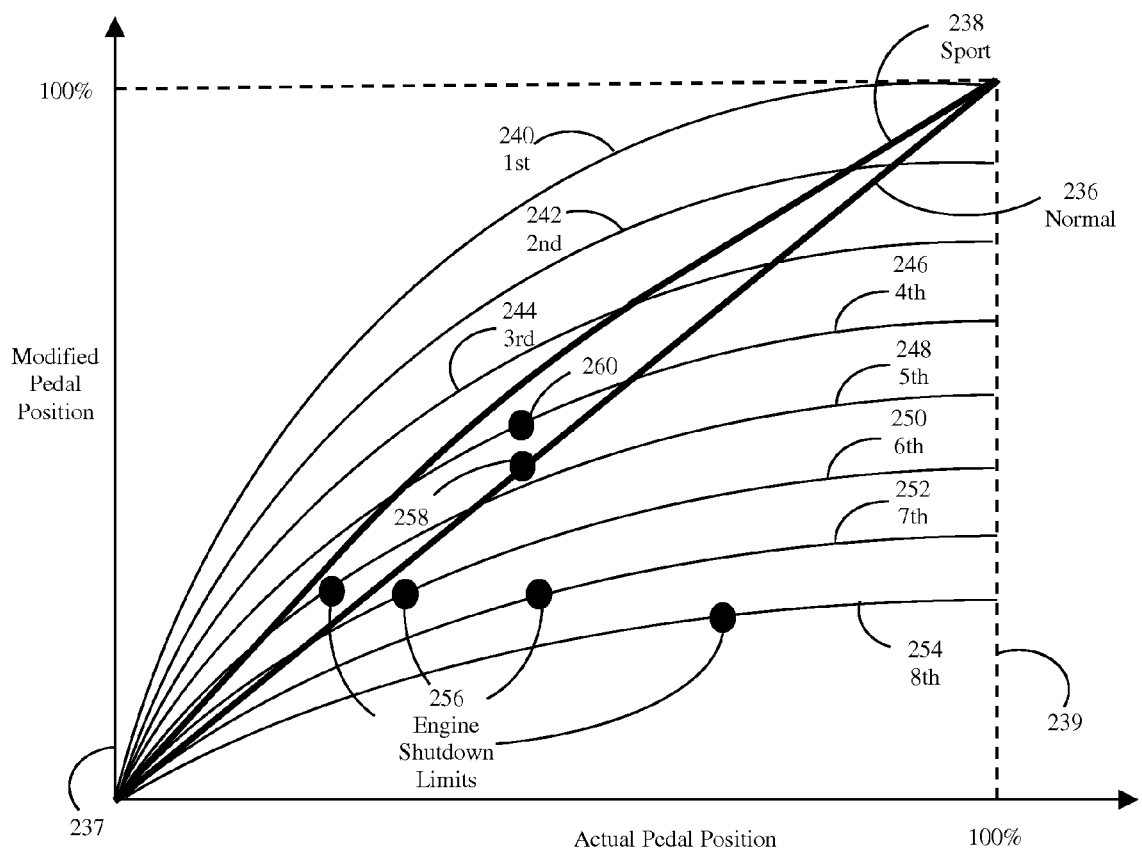
FIG. 7 is a graph illustrating a relationship between actual accelerator pedal position, virtual gear number or operating mode, and modified pedal position of a representative embodiment according to the disclosure.

At step 76, a modified accelerator pedal position is calculated from the measured accelerator pedal position using a table such as illustrated in FIG. 7. This modified accelerator pedal position is used in place of the actual pedal position in step 66' to calculate the target output torque. The curves in FIG. 7 are selected to simulate the output torque capability of a powertrain with a discrete ratio transmission. Specifically, as the virtual gear number ($1^{st}$ through $8^{th}$ in this example) increases, the resulting target output torque is lower for any given non-zero accelerator pedal position. The combined effect of steps 76 and 66' is operation of the engine and at least one traction motor such that combined output torque corresponds to one of a plurality of output torque functions, each output torque function having a distinct output torque at a maximum value of accelerator pedal position for an associated vehicle speed.

The initial virtual gear is selected at step 74. The operating point with respect to FIG. 7 is along line 236 prior to the transition. The controller selects virtual gear number corresponding to the next higher curve from among curves 240-254. In other words, the controller selects a virtual gear number based on the current actual pedal position such that, in the selected virtual gear the modified pedal position is higher than the actual pedal position, but the modified pedal position would be less than the actual pedal position in the next higher virtual gear. For example, if the operating point before the transition is point 258, $4^{th}$ gear would be selected such that the operating point becomes point 260. This has the effect of ensuring that wheel torque increases upon transitioning from Normal mode to LID mode at constant accelerator position.

Figure 6:
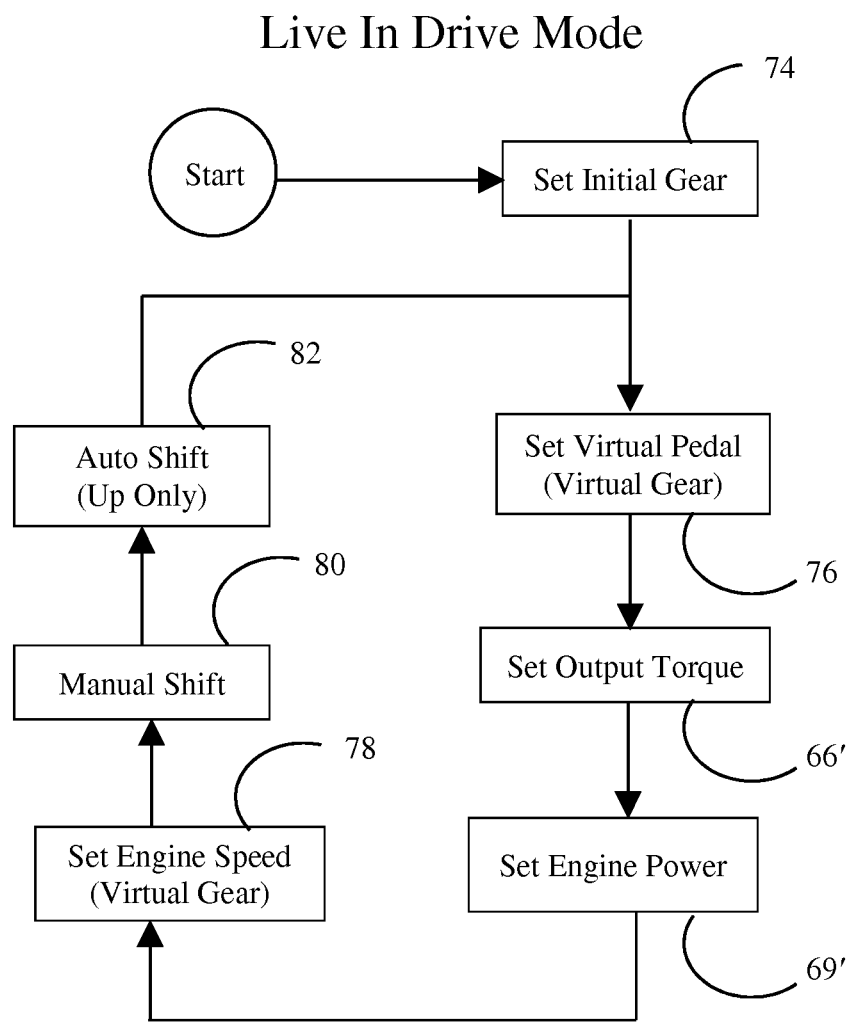
FIG. 6 is a flow chart illustrating operation of a system or method according to various embodiments when in the Live-In-Drive (LID) operating mode.
Figure 8:
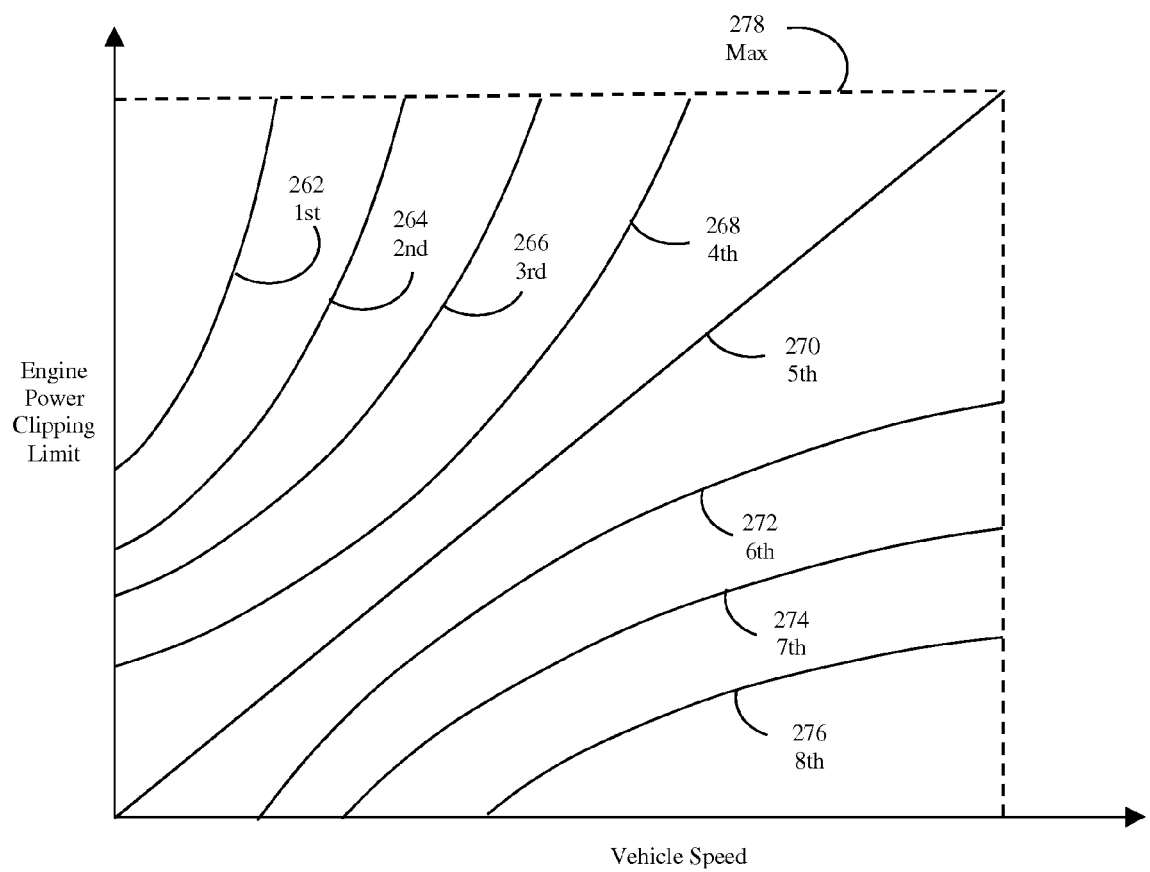
FIG. 8 is a graph illustrating a relationship between vehicle speed, virtual gear number, and engine power clipping limit of a representative embodiment according to the disclosure.

As also shown in FIG. 6, in LID mode 72, the target engine power is calculated at step 69' and target engine speed is calculated at step 78. At step 78, the controller first calculates a clipping limit for the engine power based on the vehicle speed and the currently selected virtual gear number using a table such as illustrated in FIG. 8. For example, if the current virtual gear number is 4, the clipping limit would be set according to curve 268. If the clipping limit is higher than the target engine power, then the clipping limit is used in place of the target engine power to calculate the target engine speed. When the clipping limit is used, engine speed is set higher in lower virtual gear numbers than it would be set in higher virtual gear numbers. Also, when the clipping limit is used, the target engine speed does not vary as accelerator pedal position varies. When the clipping limit is less than the target engine power, which would be most likely when a high virtual gear number is selected, then the target engine speed is the same in LID mode as it would be in Normal mode. The clipping limit does not impact the commanded engine power which is adjusted to deliver the target wheel torque.

As also shown in FIG. 6, in step 80, the controller checks for activations of either the upshift selector or the downshift selector and adjusts the virtual gear number accordingly. In step 82, the controller determines if there is a need to automatically adjust the virtual gear number. In particular, an upshift can be triggered by an increase in vehicle speed. Similarly, a downshift can be indicated when vehicle speed decreases. However, as mentioned previously, the controller transitions back to Normal mode 62 when an automatic downshift is indicated. In this embodiment, the automatic shift criteria are calibrated such that automatic changes in virtual gear number are generally less common than shifts in a traditional discrete ratio automatic transmission.

Referring once again to FIG. 2, the controller transitions from Normal mode 62 to Sport mode 94 whenever the driver moves the shift lever 44 to the Sport (S) position. Operation in Sport mode is illustrated by the flow diagram of FIG. 9. The controller repeatedly performs the operations of setting the output torque 96 and 66", setting the engine speed 99, and setting the engine mode 98. To provide a more sporty reaction to accelerator pedal movements, the target output torque is computed based on a modified accelerator pedal position as illustrated by the upper heavy line 238 in FIG. 7. The mapping between actual accelerator pedal position and modified accelerator pedal position is selected such that the value is equal at the minimum 237 and maximum 239 values, but the modified value is higher for all intermediate levels.

Figure 9:
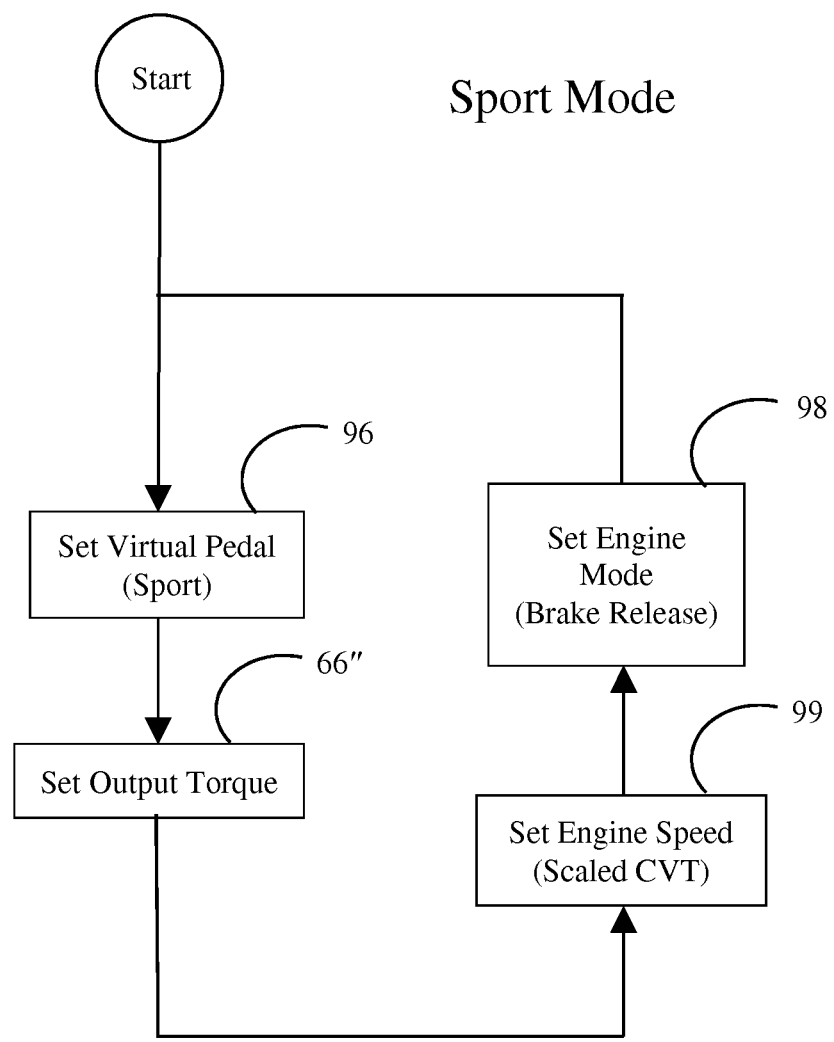
FIG. 9 is flow chart illustrating operation of a system or method according to embodiments of the disclosure when in the Sport operating mode.
Figure 10:
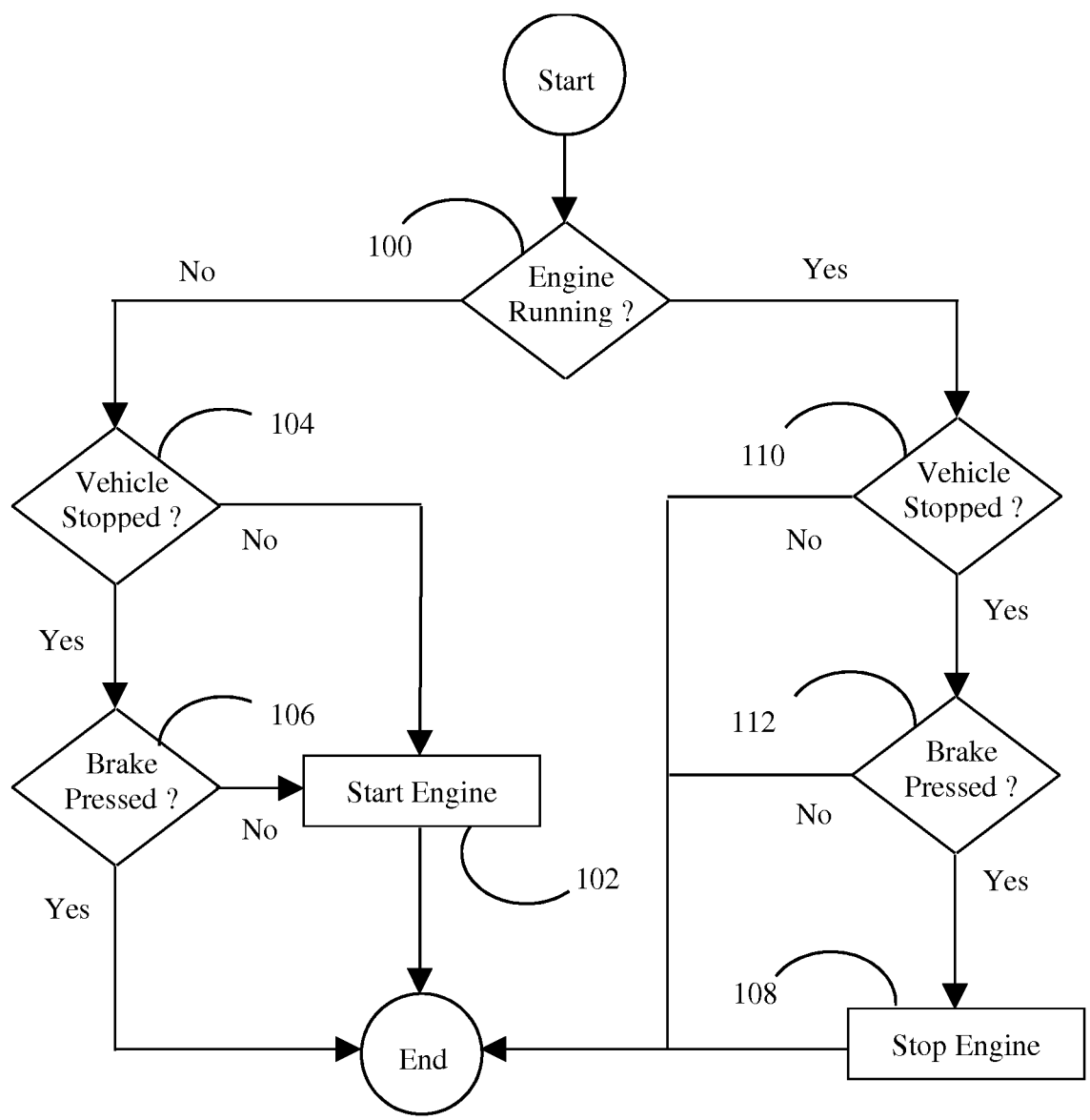
FIG. 10 is a flow chart illustrating operation of a strategy for shutting off and restarting the engine in certain operating modes of various embodiments of the disclosure.

As also shown in FIG. 9, target engine speed is set in step 99 using a similar algorithm to that used in Normal mode. However, the target engine speed is scaled up by a designated amount, such as 10-20% for example, relative to the value that would be used in Normal mode. Unlike the algorithm for setting engine mode used in Normal mode, the algorithm used in Sport mode as indicated at step 98 only stops the engine when the vehicle is stationary and the brake pedal is depressed. The modified engine mode setting algorithm is illustrated in FIG. 10. If the engine is currently stopped 100, then the engine is restarted at step 102 if the vehicle is moving 104 or the brake pedal is released 106. Similarly, if the engine is currently running, then the engine is stopped at step 108 only if the vehicle is stationary 110 and the brake pedal is pressed 112.

Figure 11:
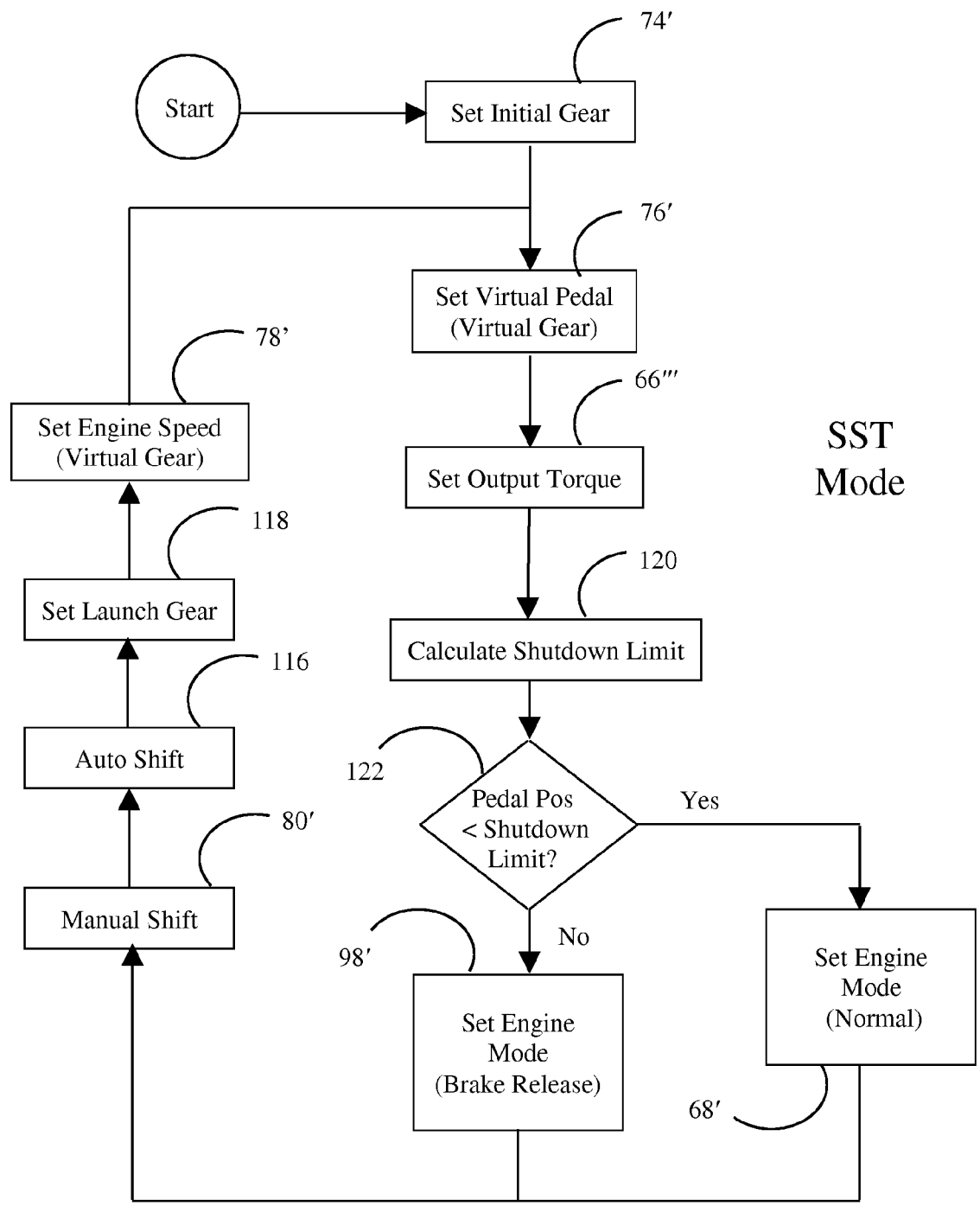
FIG. 11 is a flow chart illustrating operation of a system or method when in the SST operating mode according to various embodiments of the disclosure.

If the driver activates either the upshift or downshift selector while in Sport mode 94, the controller transitions to Select Shift Transmission (SST) mode 114, as shown in FIG. 2. In SST mode, the target engine torque and target engine speed are set based on the virtual gear number, as described with respect to LID mode. However, the controller will remain in SST mode until the driver indicates a desire to leave this mode by either holding a shift selector 48 or 50 for several seconds of by moving shift lever 44 back to the Drive (D) position. Operation in SST mode is illustrated by the flow diagram of FIG. 11. The initial virtual gear number is set at step 74' using an analogous method to that used when entering LID as described above except that the initial operating point is along curve 238 in FIG. 7 instead of curve 236. Therefore, the controller selects the highest virtual gear number for which the modified pedal position is higher than it would be in Sport mode. This ensures an increase in wheel torque upon transitioning into SST mode. In SST mode, the virtual gear number is adjusted at step 80' in response to activation of downshift selector 48 and upshift selector 50 in the same manner as in LID mode. In addition, the controller can automatically adjust the virtual gear number, either up or down, in response to changes in vehicle speed or accelerator pedal position. This automatic feature sets the virtual gear number to 1st gear as the vehicle comes to a stop. However, the driver can override this selection by manipulating the shift selectors while the vehicle is stationary in step 118. In SST mode, the engine mode depends on the virtual gear number, vehicle speed, and accelerator pedal position. In step 120, the controller calculates an engine shutdown limit, which is an accelerator pedal position below which electric drive is enabled. The shutdown limit is a function of output power demand, virtual gear number, and vehicle speed. The shutdown limits for several gear ratios at a particular vehicle speed and output power demand are illustrated by black circles in FIG. 7. When one of the higher virtual gear numbers, i.e. 5th-8th, is active and the accelerator pedal position is less than the shutdown limit, the normal engine mode algorithm 68' of Normal mode is used. If a lower virtual gear number, i.e. 1st-4th, is active, or if the accelerator position is above the engine shutdown limit, then the more restrictive algorithm 98' of Sport and LID modes is used.

As illustrated by the representative embodiments described above, various embodiments according to the present disclosure can provide one or more advantages, such as emulating a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method of controlling a vehicle comprising:
   receiving signals from a speed sensor, a pedal, and a shift selector;
   controlling an engine and traction motor in an automatic mode to produce an output torque based on a pedal position and a vehicle speed; and
   increasing the output torque to transition to a select shift mode wherein the output torque is based on a driver modifiable virtual gear number, the pedal position, and the vehicle speed.

2. The method of claim 1 wherein, in the select shift mode, the output torque decreases as virtual gear number increases.

3. The method of claim 2 further comprising, when transitioning to select shift mode at constant vehicle speed and pedal position, selecting a highest initial virtual gear number such that the output torque increases.

4. The method of claim 1 wherein the transition is initiated in response to operation of the shift selector.

5. The method of claim 1 further comprising decreasing the virtual gear number and increasing the output torque in response to driver operation of the shift selector while operating in the select shift mode.

6. The method of claim 1 further comprising increasing the virtual gear number and decreasing the output torque in response to driver operation of the shift selector while operating in the select shift mode.

7. A controller for a hybrid electric vehicle, the controller comprising:
   communication channels configured to receive signals indicating a vehicle speed, a position of a driver operated accelerator pedal, and operation of a shift selector and configured to send signals to control an engine and at least one traction motor; and
   control logic configured to
      control the engine and traction motor in an automatic mode to produce a transmission output torque based on the pedal position and the vehicle speed; and
      increase the transmission output torque to transition to a select shift mode wherein the transmission output torque is based on a driver modifiable virtual gear number, the pedal position, and the vehicle speed.

8. The controller of claim 7 wherein the control logic is configured to adjust the transmission output torque, when operating in the select shift mode in a given virtual gear number, such that the transmission output torque is less than it would be at the same pedal position and vehicle speed in the next higher virtual gear number.

9. The controller of claim 8 wherein the control logic is configured to select a highest available initial virtual gear number such that the transmission output torque increases when transitioning to select shift mode at constant pedal position and vehicle speed.

10. The controller of claim 7 further comprising control logic configured to respond to operation of the shift selector, while operating in the select shift mode, by increasing the transmission output torque.

11. The controller of claim 7 further comprising
   control logic configured to respond to operation of the shift selector, while operating in the select shift mode, by decreasing the transmission output torque.

* * * * *